United States Patent
Mizutani et al.

(10) Patent No.: US 9,329,266 B2
(45) Date of Patent: May 3, 2016

(54) WEATHER RADAR APPARATUS, OBSERVATION SEQUENCE GENERATION METHOD, AND OBSERVATION SEQUENCE GENERATION PROGRAM

(71) Applicant: KABUSHIKI KAISHA TOSHIBA, Minato-ku (JP)

(72) Inventors: Fumihiko Mizutani, Yokohama (JP); Hideki Marui, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 269 days.

(21) Appl. No.: 14/169,505

(22) Filed: Jan. 31, 2014

(65) Prior Publication Data
US 2014/0253370 A1 Sep. 11, 2014

(30) Foreign Application Priority Data
Mar. 6, 2013 (JP) .................................. 2013-043929

(51) Int. Cl.
*G01S 13/95* (2006.01)
*G01S 7/28* (2006.01)

(52) U.S. Cl.
CPC .. *G01S 13/95* (2013.01); *G01S 7/28* (2013.01)

(58) Field of Classification Search
CPC .................................. G01S 13/95; G01S 7/28
USPC ............ 342/26 R, 26 A–26 D, 74–77, 98–99, 342/107, 113, 115
See application file for complete search history.

(56) References Cited

U.S. PATENT DOCUMENTS

| | | | | |
|---|---|---|---|---|
| 5,539,409 A | * | 7/1996 | Mathews | .............. G01S 13/953 342/196 |
| 6,018,307 A | * | 1/2000 | Wakayama | ............. G01S 13/87 342/179 |

(Continued)

FOREIGN PATENT DOCUMENTS

| | | |
|---|---|---|
| JP | 11-237477 A | 8/1999 |
| JP | 11-271443 A | 10/1999 |

(Continued)

OTHER PUBLICATIONS

Zheng YuanYuan; Wang Xiaolei, "A Study of Drop-Size Distribution in Precipitation Cloud from Wind Profile Radar," in Education Technology and Training, 2008 and 2008 International Workshop on Geoscience and Remote Sensing. ETT and GRS 2008. International Workshop on , vol. 1, No., pp. 571-574, Dec. 21-22, 2008.*

(Continued)

*Primary Examiner* — John B Sotomayor
(74) *Attorney, Agent, or Firm* — Oblon, McClelland, Maier & Neustadt, L.L.P.

(57) ABSTRACT

According to one embodiment, a weather radar apparatus includes an antenna apparatus, a signal processing apparatus, a data converter, a forecasting unit, a state determination unit, and radar controller. The antenna apparatus radiates a radar pulse and receives a reflection pulse. The signal processing apparatus calculates a reception intensity, a Doppler speed, and a speed width. The data converter calculates rainfall intensity data and wind direction/speed data. The forecasting unit generates forecasting data based on the rainfall intensity data and on the wind direction/speed data. The state determination unit generates an observation sequence. The radar controller controls the antenna apparatus in accordance with the observation sequence.

7 Claims, 4 Drawing Sheets

(56) References Cited

U.S. PATENT DOCUMENTS

| | | | | |
|---|---|---|---|---|
| 6,266,063 | B1* | 7/2001 | Baron | G06T 17/05 345/419 |
| 7,515,088 | B1* | 4/2009 | Woodell | G01S 7/003 342/175 |
| 7,633,428 | B1* | 12/2009 | McCusker | G01S 7/003 342/26 B |
| 2009/0160700 | A1* | 6/2009 | Messer-Yaron | G01W 1/10 342/26 R |
| 2012/0303278 | A1* | 11/2012 | Dannevik | G01W 1/10 702/3 |
| 2014/0253370 | A1* | 9/2014 | Mizutani | G01S 13/95 342/26 R |

FOREIGN PATENT DOCUMENTS

| | | | |
|---|---|---|---|
| JP | 2000009857 A | * | 1/2000 |
| JP | 2010-271058 A | | 12/2010 |
| JP | 2011-33528 A | | 2/2011 |

OTHER PUBLICATIONS

Csiszar, I.; Kerenyi, J., "Combined use of radar and satellite information for precipitation estimation in Hungary," in Geoscience and Remote Sensing Symposium, 1996. IGARSS '96. 'Remote Sensing for a Sustainable Future.', International , vol. 2, No., pp. 1114-1116 vol. 2, May 27-31, 1996.*

Chen Qian; Niu Shengjie; Zhang Yu; Xu Feng, "Z-R Relationship from the Particle Size and Velocity (Parsivel) Optical Disdrometer and its Application in Estimating Areal Rainfall," in Bioinformatics and Biomedical Engineering, 2008. ICBBE 2008. The 2nd International Conference on , vol., No., pp. 4637-4640, May 16-18, 2008.*

"Chapter 9 Meteorological Radar", Radar Technology (Revision), Information and Communication Engineers, First Edition, Oct. 1, 1996, pp. 248-250 (with partial English translation).

Office Action issued Apr. 14, 2015 in Japanese Patent Application No. 2013-043929 (with English language translation).

* cited by examiner

WEATHER RADAR APPARATUS, OBSERVATION SEQUENCE GENERATION METHOD, AND OBSERVATION SEQUENCE GENERATION PROGRAM

CROSS-REFERENCE TO RELATED APPLICATIONS

This application is based upon and claims the benefit of priority from prior Japanese Patent Application No. 2013-043929, filed Mar. 6, 2013, the entire contents of which are incorporated herein by reference.

FIELD

Embodiments described herein relate generally to a weather electronic apparatus and an observation sequence generation program.

BACKGROUND

A weather radar apparatus using a parabolic antenna transmits a pulse signal by a thin beam named a pencil beam in a procedure according to a preset observation sequence. The observation sequence shows an observation procedure when the weather radar apparatus observes surroundings. The weather radar apparatus collects three-dimensional rain data by repeating a procedure in which an antenna is rotated horizontally by 360 degrees at a predetermined elevation angle to obtain observational data in one plane and data in a next plane is then obtained with the elevation angle increased.

On the other side, spatial distribution of a target rain differs for each phenomenon and varies every moment. In order to minimize damage inflicted by microburst, a shear line, a local severe rain, and lightning which a cumulonimbus cloud accompanies, it is effective to check a growth degree of a cumulonimbus cloud in a perpendicular direction. However, with the weather radar apparatus described above, an antenna is scanned according to the preset observation sequence, and therefore, only conditions of the cumulonimbus cloud can be observed at the preset elevation angle. A center part of a cumulonimbus cloud cannot be observed with high density. Therefore, estimation of the growth degree of a cumulonimbus cloud in a perpendicular direction can include an error.

DETAILED DESCRIPTION

In general, according to one embodiment, a weather radar apparatus includes an antenna apparatus, a signal processing apparatus, a data converter, a forecasting unit, a state determination unit, and radar controller. The antenna apparatus radiates a radar pulse and receives a reflection pulse of the radiated radar pulse reflected. The signal processing apparatus calculates a reception intensity, a Doppler speed, and a speed width, based on the reflection pulse. The data converter calculates rainfall intensity data based on the reception intensity, and calculates wind direction/speed data based on the Doppler speed and speed width. The forecasting unit generates forecasting data which forecasts spatial distribution of a target rain, based on the rainfall intensity data and on the wind direction/speed data. The state determination unit generates an observation sequence in a manner that, if the forecasting data includes data exceeding a setting value as a result of comparing the forecasting data with the setting value, an observation of an area corresponding to the data exceeding the setting value is performed in place of at least an observation of another area. The radar controller controls the antenna apparatus in accordance with the observation sequence.

First Embodiment

Figure 1:
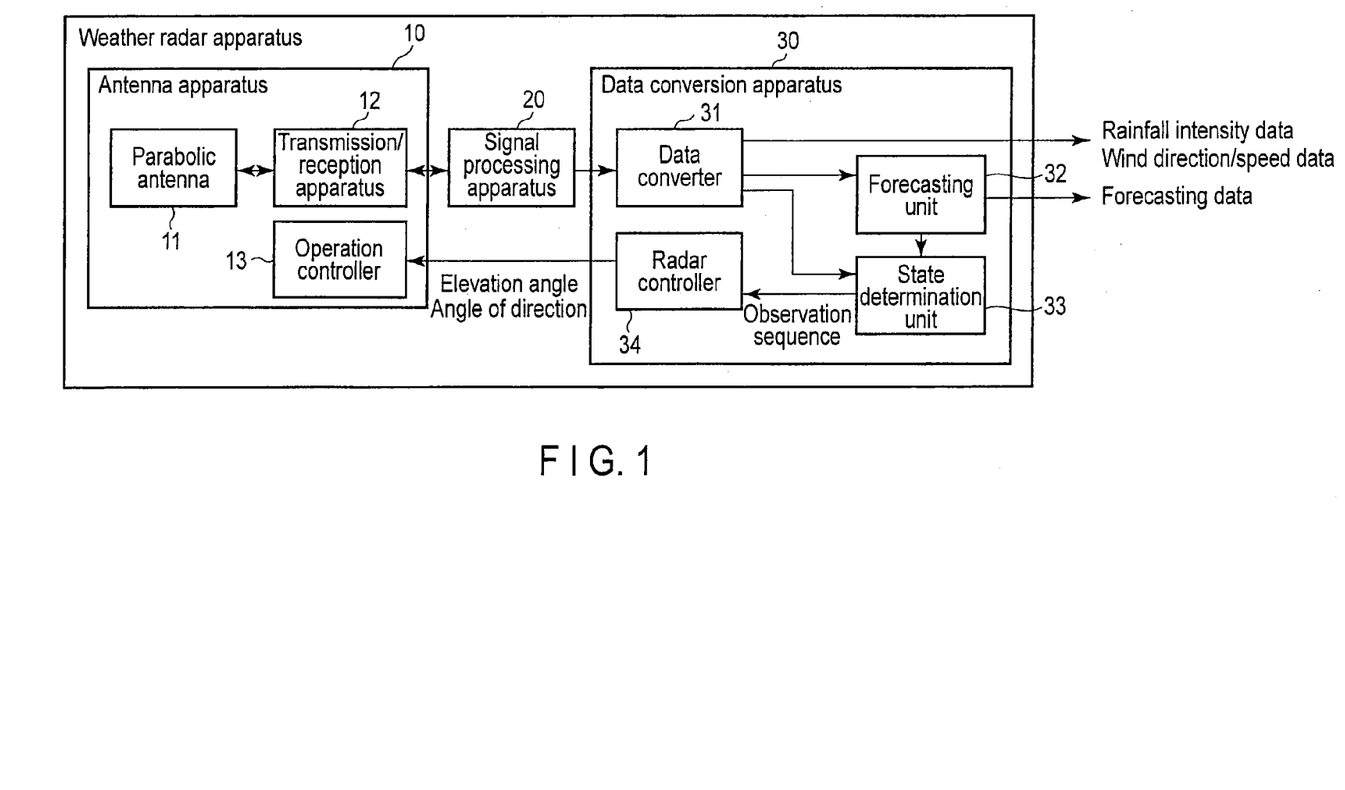
FIG. 1 is a block diagram showing a functional configuration of a weather radar apparatus according to the first embodiment.

FIG. 1 is a block diagram showing a functional configuration of a weather radar apparatus according to the first embodiment. The weather radar apparatus shown in FIG. 1 comprises an antenna apparatus 10, a signal processing apparatus 20, and a data conversion apparatus 30.

The antenna apparatus 10 comprises a parabolic antenna 11, a transmission/reception apparatus 12, and an operation controller 13.

When a transmission Intermediate Frequency (IF) signal in an analog format is supplied from the signal processing apparatus 20, the transmission/reception apparatus 12 performs up conversion of the supplied transmission IF signal into a transmission Radio Frequency (RF) signal in a RF band. The transmission/reception apparatus 12 amplifies transmission power of the transmission RF signal, and modulates the amplified transmission RF signal into a pulse signal. The transmission/reception apparatus 12 radiates, to the air, a pulse signal by a pencil beam having a sharp directivity, which is generated by the parabolic antenna 11.

The radiated pulse signal is reflected by an observation target and is captured as a reflection pulse by the parabolic antenna 11. In the present embodiment, the observation target is rain particles which exist in a predetermined effective reflecting area.

The transmission/reception apparatus 12 receives the reflection pulse by the parabolic antenna 11, and amplifies the received reflection pulse. The transmission/reception apparatus 12 performs down conversion of the amplified reflection pulse into an IF band. The transmission/reception apparatus 12 outputs the down converted reflection pulse to the signal processing apparatus 20.

The operation controller 13 controls a drive motor of the parabolic antenna 11 to be directed at an elevation angle and an angle of direction which are specified by an observation sequence. For example, the operation controller 13 makes the pencil beam to be directed in the direction of the elevation angle specified by an observation sequence, and rotates the pencil beam to the angle of direction of 360 degrees at the elevation angle in about thirty seconds.

The signal processing apparatus 20 generates a transmission IF signal in an analog format in accordance with a supplied digital control signal, and outputs the generated transmission IF signal to the transmission/reception apparatus 12.

The signal processing apparatus 20 performs IQ detection, analog/digital conversion, and pulse compression, on the reflection pulse which is subjected to a signal reception processing by the transmission/reception apparatus 12. The signal processing apparatus 20 calculates a reception intensity, based on the reflection pulse subjected to pulse compression. The signal processing apparatus 20 calculates a Doppler speed and a speed width from an amount of phase change of the reflection pulse subjected to the IQ detection. The signal processing apparatus 20 outputs the calculated reception intensity, Doppler speed, and speed width to a data conversion apparatus 30.

The data conversion apparatus 30 comprises, for example, a Central Processing Unit (CPU) configured by a microprocessor, and a Read Only Memory (ROM) and a Random Access Memory (RAM) which store programs and data to cause the CPU to perform processings. The data conversion apparatus 30 performs functions of a data converter 31, a forecasting unit 32, a state determination unit 33, and a radar controller 34 by causing the CPU to execute an application program.

The data converter 31 converts, into rainfall intensity data, the reception intensity calculated by the signal processing apparatus 20, based on a radar equation. The data converter 31 outputs the calculated rainfall intensity data to the state determination unit 33. Also, the data converter 31 calculates wind direction/speed data, based on the Doppler speed and speed width calculated by the signal processing apparatus 20. The data converter 31 outputs the calculated rainfall intensity data and wind direction/speed data to the forecasting unit 32 and a display unit (not shown).

The forecasting unit 32 forecasts spatial distribution of a target rain in the future, based on the rainfall intensity data and on the wind direction/speed data supplied from the data converter 31. The forecasting part 32 generates a plurality of observation data corresponding to observation timings. For example, if an observation of a plane takes thirty seconds, the forecasting unit 32 generates forecasting data for every thirty seconds. The forecasting unit 32 outputs the generated forecasting data to the state determination unit 33. The forecasting unit 32 outputs the generated forecasting data to a display unit, and displays the forecasting data to an operator.

The state determination unit 33 compares the rainfall intensity data supplied from the data converter 31 and the forecasting data supplied from the forecasting unit 32, with setting values, and determines whether there is any data exceeding a setting value among the rainfall intensity data and forecasting data. For the setting values, values which allow determination of whether or not "hail" is contained in the particle identification data obtained by dual polarization observation, values which allow determination of whether or not the rainfall intensity data of YY mm/h or greater is present at the XX km above, or the like are used. The state determination unit 33 generates an observation sequence so as to observe, with high density, an area corresponding to data exceeding setting values, i.e., an area which is assumed to be the center part of a cumulonimbus cloud. At this time, the state determination unit 33 sets each of observation directions in an observation sequence while monitoring changes of the spatial distribution of a target rain on the basis of the forecasting data.

The state determination unit 33 determines whether or not there are a plurality of areas in the height direction, each of which is assumed to be the center part of a cumulonimbus cloud, whether or not the width of a cumulonimbus cloud is narrower than a preset width, or whether the height of a cumulonimbus cloud is higher than the preset height. If there are a plurality of areas assumed to be center parts in the height direction and if the width of a cumulonimbus cloud is narrower than a preset width or if the height of a cumulonimbus cloud is higher than a preset height, the state determination unit 33 generates an observation sequence so as to observe vertical planes including the areas assumed to be center parts of the cumulonimbus cloud with high density. If three conditions are satisfied where one of the three conditions is that there are a plurality of areas assumed to be center parts in the height direction, another one is that the width of a cumulonimbus cloud is narrower than a preset width, and still another one is that the height of the cumulonimbus cloud is higher than a preset height, the state determination unit 33 may generate an observation sequence so as to perform an observation in the vertical direction, or if any of the conditions is satisfied, the state determination unit 33 may generate an observation sequence so as to perform an observation in the vertical direction.

Further, if data having a strong rainfall intensity exists in a narrow area in rainfall intensity data, i.e., if a robust cumulonimbus cloud exists locally, the state determination unit 33 may specify an area of a predetermined range having a strong rainfall intensity and generate an observation sequence so as to perform sector scanning to observe only the area of the range.

The radar controller 34 specifies the elevation angle and the angle of direction of the parabolic antenna 11, and outputs the specified elevation angle and the angle of direction to the operation controller 13 so as to perform the observation sequence generated by the state determination unit 33.

Figure 2:
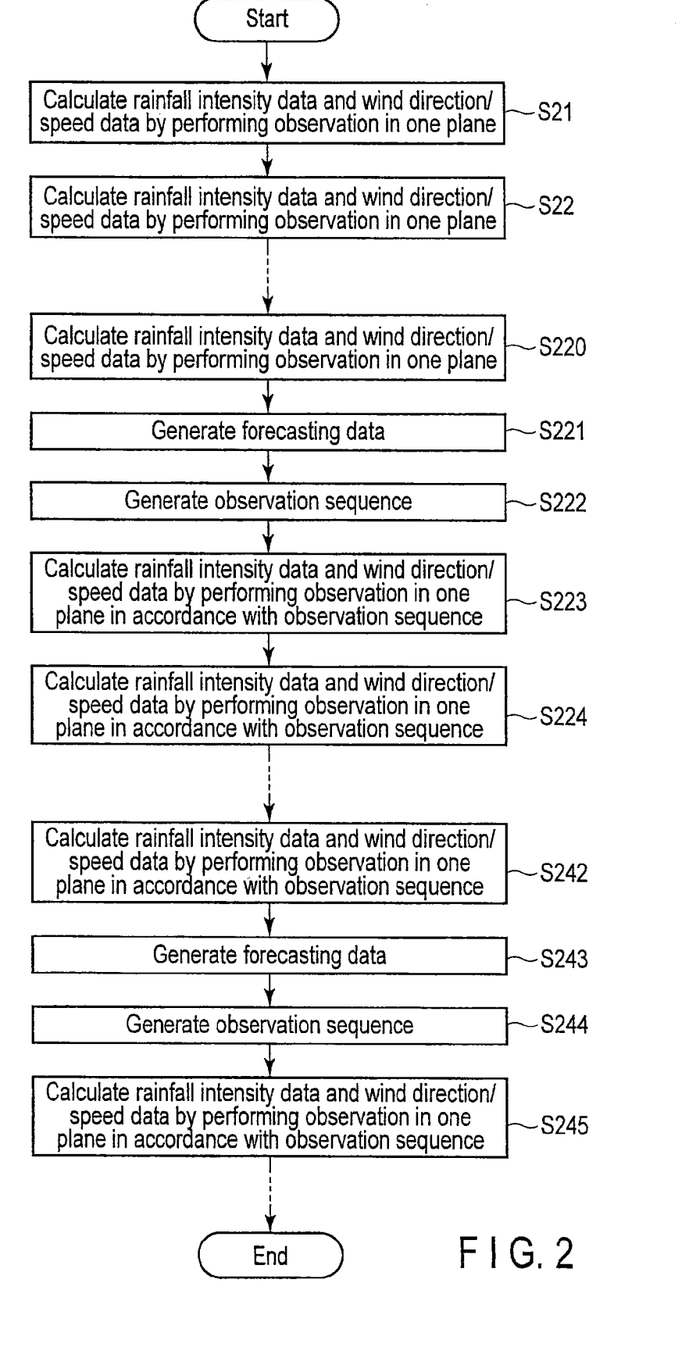
FIG. 2 is a flowchart of operation when the weather radar apparatus shown in FIG. 1 obtains rainfall intensity data.

Operation in which the weather radar apparatus configured as described above obtains rainfall intensity data will now be described. FIG. 2 shows a flowchart when the weather radar apparatus according to the first embodiment obtains rainfall intensity data. In FIG. 2, the weather radar apparatus is supposed to observe spatial distribution of a target rain in a plane in about thirty seconds. In the observation sequence in FIG. 2, an elevation angle and an angle of direction are shown with respect to an observation procedure during ten minutes or, namely, for twenty observations. In FIG. 2, an observation sequence for the first ten minutes is generated in advance, and an observation sequence from subsequent ten minutes is generated by the state determination unit 33 for every ten minutes. In the preset observation sequence, for example, the antenna is rotated by 360 degrees at an elevation angle of 5 degrees, to obtain rainfall intensity data and wind direction/speed data in a plane. Hence, the elevation angle is increased in units of a predetermined width from the elevation angle of 5 degrees, and simultaneously, the rainfall intensity data and the wind direction/speed data are obtained in a plane at each of the elevation angles.

Figure 3:
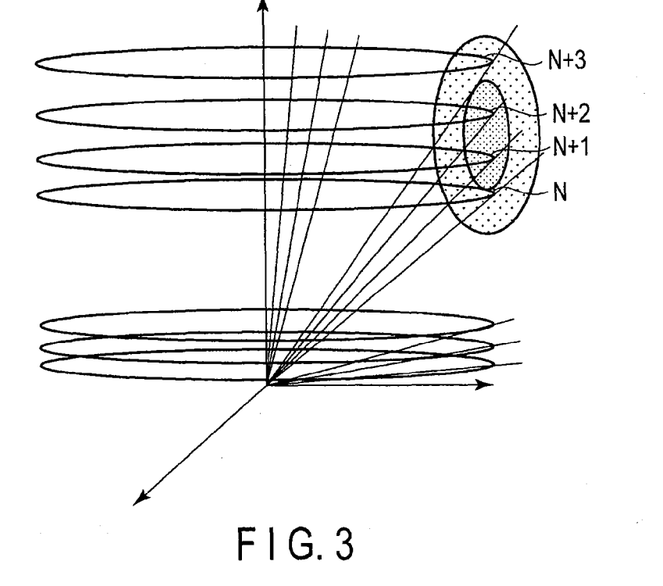
FIG. 3 is a diagram when the weather radar apparatus shown in FIG. 1 observes a cumulonimbus cloud according to a preset observation sequence.

At first, the weather radar apparatus performs twenty observations in accordance with the preset observation sequence, to obtain rainfall intensity data and wind direction/speed data for each of the observations (Steps S21 to S220). FIG. 3 schematically shows a plane observed in Steps S21 to S220. A coarsely dotted part in FIG. 3 expresses a cumulonimbus cloud, and densely dotted part expresses a center part of the cumulonimbus cloud. In FIG. 3, a cumulonimbus cloud is observed in the N-th to (N+3)-th observations, and a center part of the cumulonimbus cloud is observed in the (N+1)-th and (N+2)-th observations.

Figure 4:
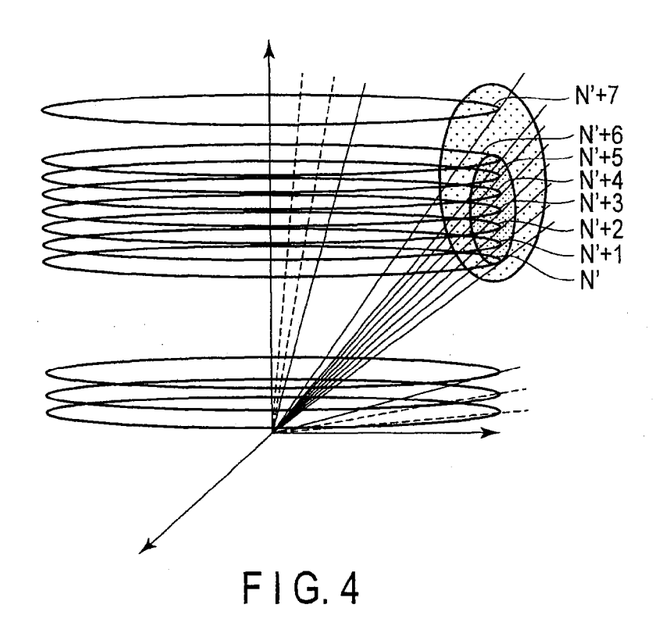
FIG. 4 is a diagram when the weather radar apparatus shown in FIG. 1 observes a cumulonimbus cloud according to a newly generated observation sequence.

Based on twenty sets of rainfall intensity data and wind direction/speed data obtained in Steps S21 to S220, forecasting data is generated from one minute later to ten minutes later at intervals of thirty seconds (Step S221). The state determination unit 33 generates an observation sequence so as to observe, with high density, an area assumed to be a center part of a cumulonimbus cloud by referring to the generated forecasting data (Step S222). FIG. 4 schematically shows planes observed in accordance with the observation sequence generated by the state determination unit 33. The number of observations at low and high elevation angles which are not assumed to observe a cumulonimbus cloud is reduced while the number of observations near the center part of the cumulonimbus cloud is increased. Accordingly, the cumulonimbus cloud is observed in the N'-th to (N'+7)-th observations, and the center part of the cumulonimbus cloud is observed in the N'-th to (N'+6)-th observations. Broken lines shown in FIG. 4 denote examples of observations at low elevation angles at which no cumulonimbus cloud is assumed to be observed, and examples of observations at high elevation angles.

A weather radar apparatus performs observations for subsequent ten minutes, i.e., twenty observations in accordance with the generated observation sequence (Steps S223 to S242).

As described above, according to the first embodiment, the weather radar apparatus forecasts a next observation sequence and spatial distribution of a target rain in a corresponding period, based on the rainfall intensity data and the wind direction/speed data obtained in accordance with a previous observation sequence. Further, the weather radar apparatus generates a next observation sequence, based on the forecasting data. In this manner, the weather radar apparatus can dynamically change the observation sequence in conformity with changes of spatial distribution of a target rain.

Therefore, with the weather radar apparatus according to the first embodiment, the center part of a cumulonimbus cloud can be observed with high density and with high precision even if observations are performed in accordance with an observation sequence.

In the first embodiment, the state determination unit 33 generates an observation sequence capable of observing spatial distribution of a target rain in vertical planes. In this manner, degrees of growth of a cumulonimbus cloud in perpendicular directions can be observed with higher precision.

Further, according to the first embodiment, the state determination unit 33 generates an observation sequence so as to perform sector scanning. In this manner, spatial distribution of a target rain within a predetermined range can be observed with higher precision.

Also, the first embodiment is described with reference to an example of generating an observation sequence for every ten minutes, though not limited to this example. The cycle for generating an observation sequence may be shorter than or not shorter than ten minutes.

Also according to the first embodiment, the weather radar apparatus is configured to be capable of observing spatial distribution of a target rain in one plane in about thirty seconds. Time required to observe a plane is not limited hitherto.

The first embodiment has been described with reference to an example case of generating at least one type of observation among a horizontal observation, a vertical observation, and an observation by sector scanning, though the embodiment is not limited to this example. For example, horizontal observations and vertical observations may be performed within an observation sequence, and horizontal observations and observations by sector scanning may be performed within an observation sequence.

Second Embodiment

The first embodiment has been described with reference to a weather radar apparatus of single polarization. However, the weather radar apparatus may be a dual polarization radar which transmits two types of pulse signals whose polarization directions are vertical and horizontal, respectively. The dual polarization radar calculates a rainfall intensity after obtaining particle size distribution and a fall speed of precipitation particles from difference between reflection factors obtained on the basis of the two types of pulse signals. Therefore, a dual polarization radar can perform an observation with higher precision than a weather radar apparatus using a pulse signal of single polarization.

Figure 5:
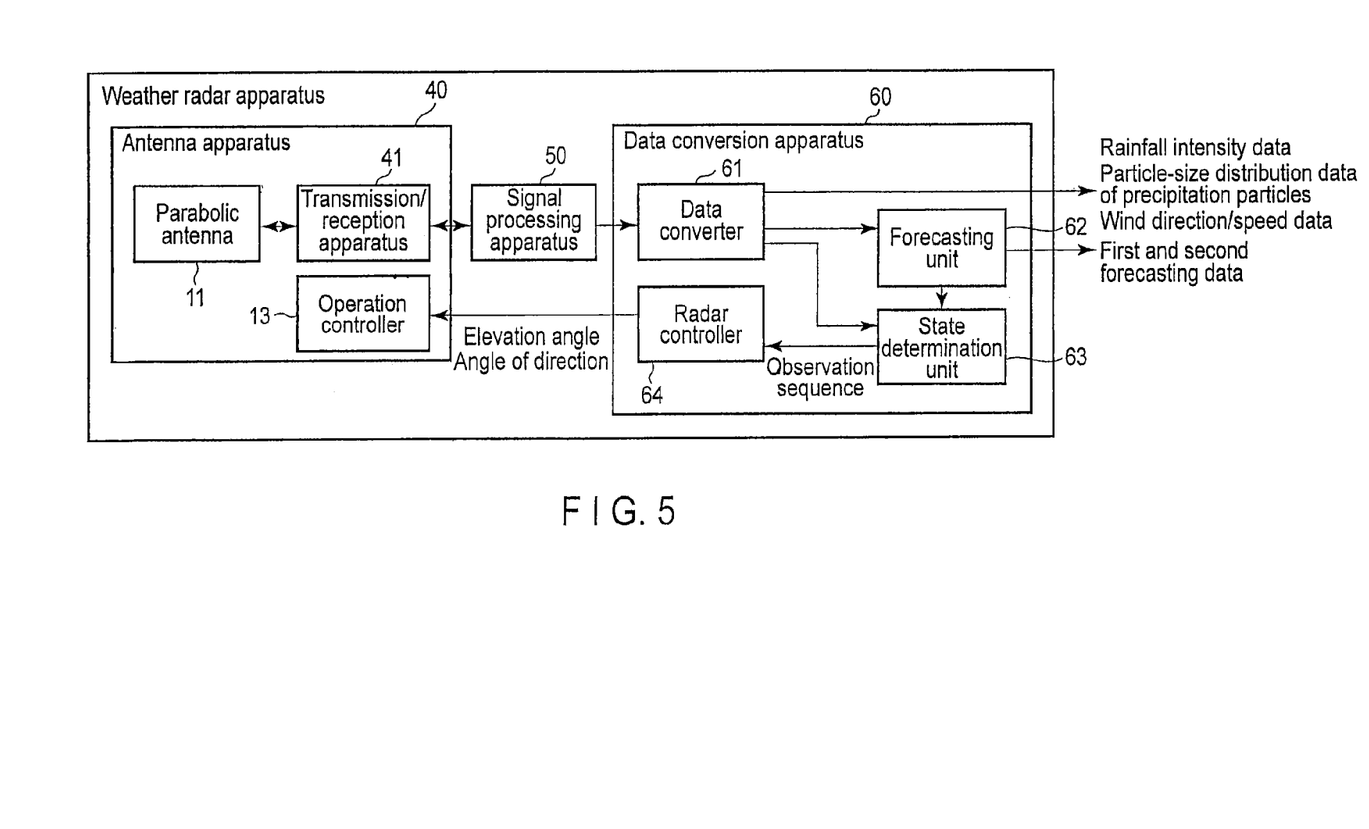
FIG. 5 is a block diagram showing a functional configuration of a weather radar apparatus according to the second embodiment.

FIG. 5 is a block diagram showing a functional configuration of a weather radar apparatus which relates to the second embodiment. The weather radar apparatus shown in FIG. 5 comprises an antenna apparatus 40, a signal processing apparatus 50, and a data conversion apparatus 60.

The antenna apparatus 40 comprises a parabolic antenna 11, a transmission/reception apparatus 41, and an operation controller 13.

When a transmission IF signal of an analog format is supplied from a signal processing apparatus 50, the transmission/reception apparatus 41 performs up conversion of the supplied transmission IF signal into a transmission RF signal in a RF band. The transmission/reception apparatus 41 amplifies transmission power of the transmission RF signal. The transmission/reception apparatus 41 modulates the transmission RF signal into a first pulse signal of a horizontal polarization wave and a second pulse signal of a vertical polarization wave while switching the polarization direction between horizontal and vertical polarization directions. The transmission/reception apparatus 41 radiates, to the air, the first and second pulse signals by a pencil beam with a sharp directivity, which is generated by the parabolic antenna 11.

The radiated first and second pulse signals are reflected by an observation target and are captured as first and second reflection pulses by the parabolic antenna 11.

The transmission/reception apparatus 41 receives the first reflection pulse originating from the first pulse signal of a horizontal polarization wave, and amplifies the received first reflection pulse. The transmission/reception apparatus 41 performs down conversion of the amplified first reflection pulse into an IF band. The transmission/reception apparatus 41 outputs the down converted first reflection pulse to the signal processing apparatus 50. The transmission/reception apparatus 41 receives the second reflection pulse originating from the second pulse signal of a vertical polarization wave, and amplifies the received second reflection pulse. The transmission/reception apparatus 41 performs down conversion of the amplified second reflection pulse into an IF band. The transmission/reception apparatus 41 outputs the down converted second reflection pulse to the signal processing apparatus 50.

The signal processing apparatus 50 generates a transmission IF signal in an analog format in accordance with a supplied digital control signal, and outputs the generated transmission IF signal to the transmission/reception apparatus 41.

The signal processing apparatus 50 performs IQ detection, analog/digital conversion, and pulse compression, on the first reflection pulse which is subjected to a signal reception processing by the transmission/reception apparatus 41. The signal processing apparatus 50 calculates a first reception intensity, based on the first reflection pulse subjected to the pulse compression. The signal processing apparatus 50 calculates a Doppler speed and a speed width from an amount of phase change of the first reflection pulse subjected to the IQ detection. The signal processing apparatus 50 outputs the calculated first reception intensity, Doppler speed, and speed width to a data conversion apparatus 60.

Also, the signal processing apparatus 50 performs IQ detection, analog/digital conversion, and pulse compression, on the second reflection pulse which is subjected to a signal reception processing by the transmission/reception apparatus 41. The signal processing apparatus 50 calculates a second reception intensity, based on the second reflection pulse subjected to the pulse compression. The signal processing apparatus 50 outputs the calculated second reception intensity to the data conversion apparatus 60. An example in which the signal processing apparatus 50 calculates the Doppler speed and speed width on the basis of the first reflection pulse as described above. However, the signal processing apparatus 50 may alternatively calculate a Doppler speed and a speed width on the basis of the second reflection pulse.

The data conversion apparatus 60 comprises a data converter 61, a forecasting unit 62, a state determination unit 63, and a radar controller 64.

The data converter 61 calculates a first reflection factor, based on the first reception intensity calculated by the signal processing apparatus 50, and calculates a second reflection factor, based on the second reception intensity. From the calculated first and second reflection factors, the data converter 61 calculates a reflection factor difference, and calculates rainfall intensity data, based on the calculated reflection factor difference. The data converter 61 calculates particle-size distribution data of precipitation particles, based on the calculated reflection factor difference. In addition, the data converter 61 calculates wind direction/speed data, based on the Doppler speed and speed width which have been calculated by the signal processing apparatus 50. The data converter 61 outputs the rainfall intensity data and particle-size distribution data to the state determination unit 63, and outputs the rainfall rate data and particle-size distribution data to the forecasting unit 62 and a display unit (not shown).

The forecasting unit 62 generates first forecasting data as spatial distribution of a target rain in the future, based on the rainfall rate data and wind direction/speed data supplied from the data converter 61. The first forecasting unit 62 outputs the generated rainfall intensity data to the state determination unit 63.

The forecasting unit 62 generates second forecasting data as particle size distribution of a target rain in the future, based on the particle-size distribution data and wind direction/speed data supplied from the data converter 61. The forecasting unit 62 outputs the generated second forecasting data to the state determination unit 63. The second forecasting unit 62 outputs the generated first and second forecasting data to the display unit, and displays the first and second forecasting data to an operator.

The state determination unit 63 determines whether the rainfall intensity data and first forecasting data include any data which exceeds a setting value or not by comparing the rainfall intensity data supplied from the data converter 61 and the first forecasting data supplied from the forecasting unit 62, with setting values. For the setting values, values which allow determination of whether or not "hail" is contained in the particle identification data obtained by dual polarization observation, values which allow determination of whether or not the rainfall intensity data of YY mm/h or greater is present at the XX km above, or the like are used. Further, the state determination unit 63 determines whether the particle-size distribution data and second forecasting data include any data which exceeds a preset particle size or not by comparing the particle-size distribution data supplied from the data converter 61 and the second forecasting data supplied from the forecasting unit 62, with setting values. The state determination unit 63 assumes that an area which corresponds to data exceeding a setting value among the rainfall intensity data and first forecasting data and which corresponds to data exceeding a predetermined particle size among the particle-size distribution data and second forecasting data is a center part of a cumulonimbus cloud. The state determination unit 63 generates an observation sequence so as to observe the area with high density.

Even if the rainfall intensity data and first forecasting data include no data exceeding a setting value, the state determination unit 63 may observe, with high density, an area corresponding to such data that exceeds the predetermined particle size among the particle-size distribution data and second forecasting data.

The radar control unit 64 specifies the elevation angle and the angle of direction of the parabolic antenna 11 and outputs the specified elevation angle and the angle of direction to the operation controller 13 so as to perform an observation sequence generated by the state determination unit 63.

As described above, according to the second embodiment, the weather radar apparatus forecasts the first forecasting data with respect to spatial distribution of a target rain and the second forecasting data with respect to the particle size distribution of precipitation particles of the target rain, based on the calculated rainfall intensity data, the particle-size distribution data of precipitation particles, and wind direction/speed data. Further, the weather radar apparatus generates a next observation sequence, based on the second forecasting data. In this manner, the weather radar apparatus can dynamically change the observation sequence in conformity with changes of spatial distribution of a target rain and changes of particle sizes of the target rain.

The weather radar apparatus can change the target rain, depending on the particle size. Therefore, for example, only a snow cloud with a great particle size can be regarded as an observation target. That is, the weather radar apparatus can dynamically change the observation sequence in accordance with a phenomenon which an observer desires to observe.

In the foregoing first and second embodiments, the weather radar apparatus has been described with reference to an example case of using the parabolic antenna 11. However, an applicable antenna is not limited to the parabolic antenna 11 as long as the antenna is a reflector antenna.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A weather radar apparatus comprising:
an antenna apparatus configured to radiate a radar pulse and receive a reflection pulse of the radiated radar pulse reflected;
a signal processing apparatus configured to calculate a reception intensity, a Doppler speed, and a speed width, based on the reflection pulse;
a data converter configured to calculate rainfall intensity data based on the reception intensity, and calculate wind direction/speed data based on the Doppler speed and speed width;
a forecasting unit configured to generate forecasting data which forecasts spatial distribution of a target rain, based on the rainfall intensity data and on the wind direction/speed data;

a state determination unit configured to generate an observation sequence in a manner that, if the forecasting data includes data exceeding a setting value as a result of comparing the forecasting data with the setting value, an observation of an area corresponding to the data exceeding the setting value is performed in place of at least an observation of another area; and a radar controller configured to control the antenna apparatus in accordance with the observation sequence.

2. The weather radar apparatus according to claim 1, wherein
the state determination unit generates the observation sequence so as to observe the area corresponding to the data exceeding the setting value, in a horizontal plane.

3. The weather radar apparatus according to claim 1, wherein
the state determination unit generates the observation sequence so as to observe the area corresponding to the data exceeding the setting value, in a vertical plane.

4. The weather radar apparatus according to claim 1, wherein
the state determination unit generates the observation sequence so as to perform sector scanning on a predetermined range in an area corresponding to the data exceeding the setting value.

5. The weather radar apparatus according to claim 1, wherein
the antenna apparatus radiates first and second radar pulses having respectively different polarization directions in directions according to the observation sequence, and receives first and second reflection pulses of the first and second radar pulses reflected;

the signal processing apparatus calculates a first reception intensity, a Doppler speed, and a speed width, based on the first reflection pulse, and calculates a second reception intensity, based on the second reflection pulse;

the data converter calculates particle-size distribution data of precipitation particles and rainfall intensity data of precipitation particles, based on the first and second reception intensities;

the forecasting unit further generates particle-size distribution forecasting data which forecasts particle-size distribution of a target rain, based on the rainfall intensity data, particle-size distribution data, and wind direction/speed data; and the state determination unit generates the observation sequence by further referring to the particle-size distribution forecasting data.

6. An observation sequence generation method, comprising:
receiving a reflection pulse as a radiated radar pulse reflected;

calculating a reception intensity, a Doppler speed, and a speed width, based on the reflection pulse;

calculating rainfall intensity data based on the reception intensity;

calculating wind direction/speed data, based on the Doppler speed and speed width;

generating forecasting data which forecasts spatial distribution of a target rain, based on the rainfall intensity data and the wind direction/speed data; and generating an observation sequence in a manner that, if the forecasting data includes data exceeding a setting value, as a result of comparing the forecasting data with the setting value, an observation of an area corresponding to the data exceeding the setting value is performed in place of at least an observation of another area than the area.

7. An observation sequence generation program for use in a weather radar apparatus, causing a computer of the weather radar apparatus to perform:
calculating a reception intensity, a Doppler speed, and a speed width, based on a reflection pulse as a radiated radar pulse reflected;

calculating rainfall intensity data, based on the reception intensity;

calculating wind direction/speed data, based on the Doppler speed and speed width;

generating forecasting data which forecasts spatial distribution of a target rain, based on the rainfall intensity data and the wind direction/speed data; and generating an observation sequence in a manner that, if the forecasting data includes data exceeding a setting value as a result of comparing the forecasting data with the setting value, an observation of an area corresponding to the data exceeding the setting value is performed in place of at least an observation of another area than the area.

* * * * *